April 5, 1927.
F. H. JOHNSON ET AL
1,623,247
CONVEYER FOR LEER CHARGING APPARATUS
Original Filed March 19, 1925   2 Sheets-Sheet 2
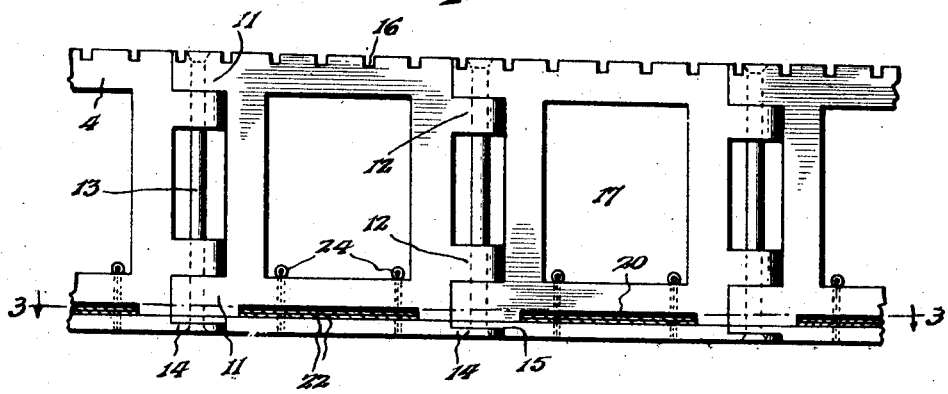
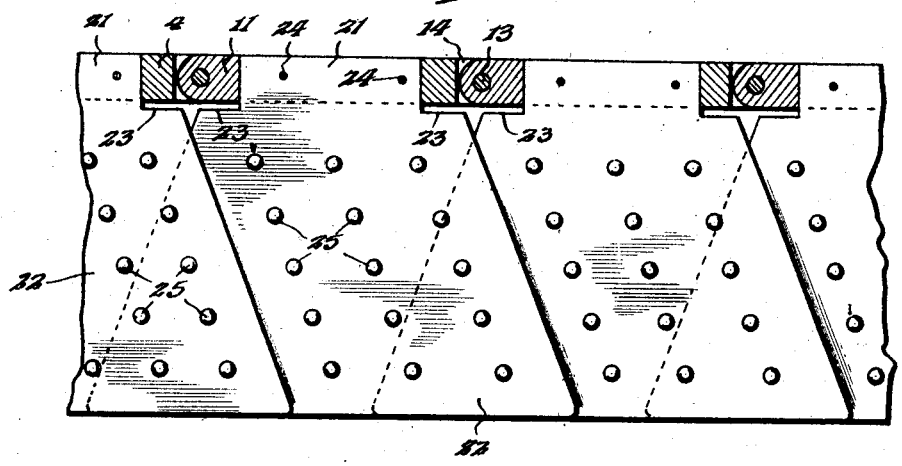
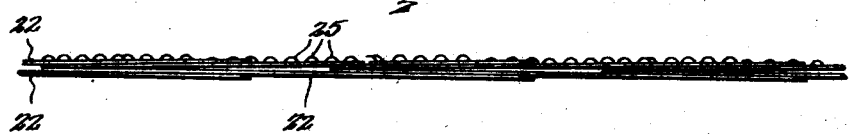

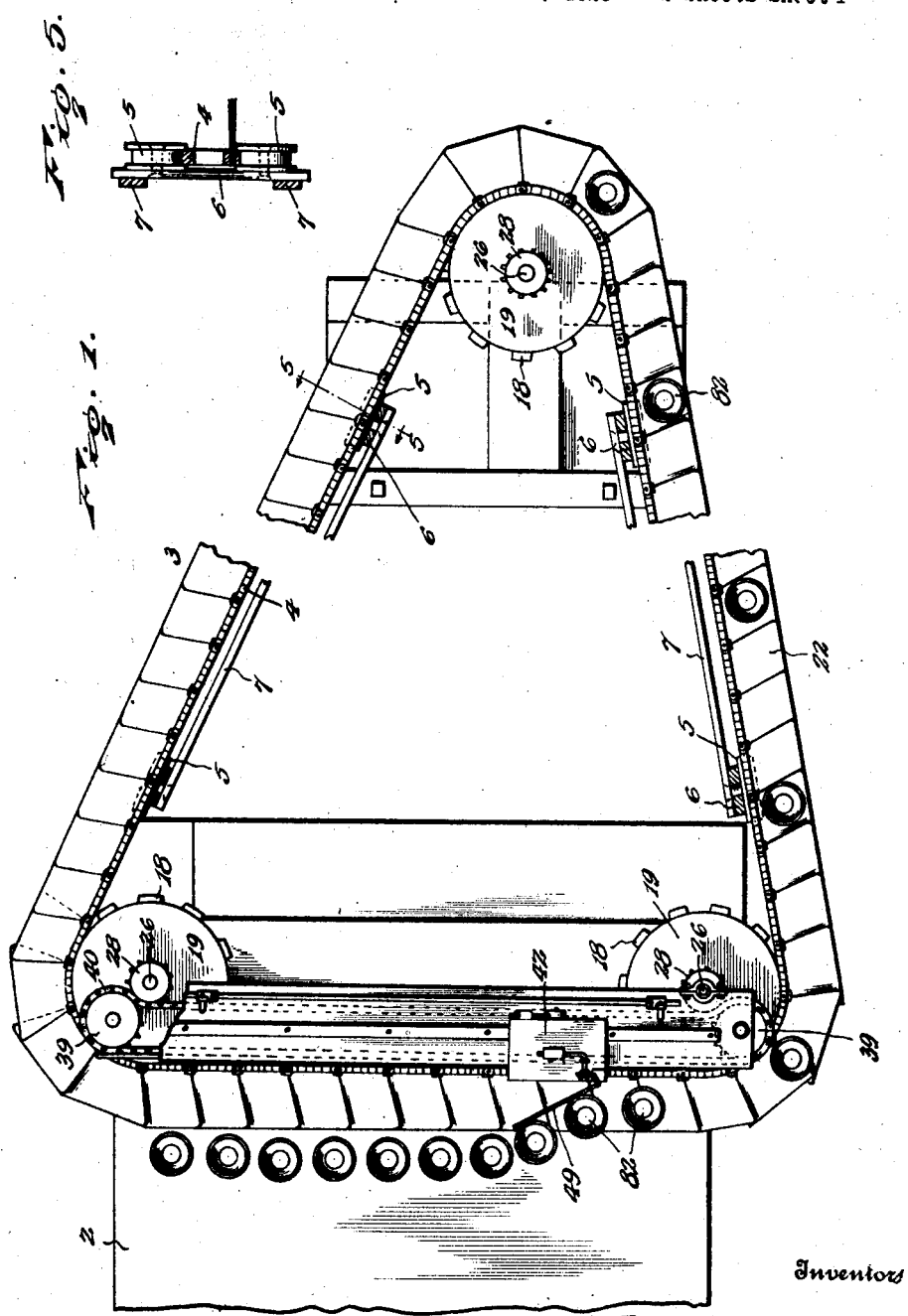

Patented Apr. 5, 1927.

1,623,247

UNITED STATES PATENT OFFICE.

FRED H. JOHNSON AND SHERMAN R. LATHROP, OF SAPULPA, OKLAHOMA.

CONVEYER FOR LEER-CHARGING APPARATUS.

Original application filed March 19, 1925, Serial No. 16,834. Divided and this application filed July 13, 1926. Serial No. 122,216.

This application is a division of an application filed by us March 19, 1925, Serial No. 16,834, the present invention relating to a conveyer for transferring glass articles from a forming machine to the moving element of a leer or annealing furnace without injury. An object of the invention is to provide a conveyer of simple construction which will present a continuous support for the articles but will accommodate the movement around an actuating element so that, while the constituent parts of the conveyer may move relative to each other, there will be no shifting or dropping of the articles upon the conveyer. A mechanism embodying the invention is illustrated in the accompanying drawings and will be hereinafter fully described, and the invention resides in certain novel features particularly defined in the appended claims.

In the drawings:

Figure 1 is a plan view, with parts in section, of the apparatus;

Fig. 2 is an enlarged side elevation, with parts in section, of the conveyer;

Fig. 3 is a view partly in plan and partly in section on the line 3—3 of Fig 2;

Fig. 4 is an edge view of the conveyer, and

Fig 5 is a detail section on the line 5—5 of Fig. 1.

The leer or annealing furnace may be of any approved form and is generally of a type in which the moving element is an endless apron 2. Our invention comprises primarily an endless conveyer, identified as an entirety by the reference numeral 3 in Fig. 1, and arranged to receive the formed articles from the molding or other forming machine and carry them to the leer. For convenience, in the following description that portion of the conveyer which is more remote from the leer will be referred to as the rear while that portion which is adjacent the leer will be referred to as the front.

The conveyer 3 comprises an endless chain consisting of plates 4 set on edge so as to work in vertical planes and pivotally connected at their adjacent side edges. The chain is supported in its vertical position by flanged or grooved rollers 5 which are arranged at intervals in pairs with the members of the pairs vertically alined so as to engage the upper and lower edges respectively of the several chain plates, as shown most clearly in Fig. 5, the rollers being mounted upon connecting plates or brackets 6 which are rigidly secured to upper and lower horizontal bars 7. The bars 7 are secured in any convenient or preferred manner to standards which are erected upon the ground or floor of the factory and may be adjusted vertically in any desired way to compensate for irregularities in the floor or other fixed supporting surface and maintain the bars 7 in horizontal planes. A casing may be secured to the standards and the bars 7 to enclose the conveyer to prevent damage thereto and also to house the formed articles as they are carried to the leer by the conveyer and thereby minimize the dissipation of the heat in the articles. A housing is connected with the casing at the front end of the latter, and so arranged as to abut the leer and extend across the rear end thereof and enclose all the working parts immediately adjacent the leer. The chain plates 4, as shown most clearly in Fig. 2, are each provided at one side edge with lugs 11 at the top and bottom of the plate and at the opposite side edge are provided with similar lugs 12 which are spaced below and above the top and bottom edges of the plates respectively to fit between the lugs 11 of an adjacent plate and be hingedly or pivotally connected therewith by pintles 13 inserted through the mating lugs. To further guard against relative vertical movement of adjacent chain plates, each plate is provided with a longitudinally extending tongue 14 at its lower edge and at that side carrying the lugs 12, and the lower lug 11 is recessed, as shown at 15, to fit over the said tongue, as clearly shown in Fig. 2. In the upper edges of the chain plates, transverse notches 16 are formed at regular intervals for a purpose which will presently appear. The chain plates are provided with large openings 17 in their central portions whereby they may be easily engaged by the sprocket teeth 18 of driving sprocket wheels 19 which are mounted to rotate in horizontal planes and thereby impart motion to the conveyer chain in an obvious manner. In the lower portion of each chain plate, but above the lower edge thereof, is a longitudinally extending slot or opening 20, and in these openings are received the tangs 21 of the conveyer plates 22. The said conveyer plates 22 extend laterally at each side of the tang 21, as shown at 23 in Fig. 3, and the outer portions of the plates are trapezoidal in form, as also shown in Fig. 3. The conveyer plates are arranged in pairs so that a pair of plates is engaged in the slot or opening 20 of each chain plate and they are secured in the said slots or openings by cotter pins or the like, 24, inserted through openings provided therefor in the bodies of the respective chain plates and through the tangs 21 of the conveyer plates. As shown most clearly in Figs. 3 and 4, the conveyer plates are of such dimensions that the meeting edges of the adjacent plates overlap, and we arrange the plates so that the forward edges of each pair of plates will extend between the rear edge portions of the immediately preceding pair of conveyer plates, this arrangement overcoming the possibility of an edge of a conveyer plate being presented to the moving element of the leer and thereby minimizing the possibility of the conveyer plates impinging squarely upon a projecting portion of the moving element of the leer. The trapezoidal form of the conveyer plates, together with the overlapping interengaging arrangement of their adjacent edges, furnishes a continuous surface to receive and support the formed articles and permits the plates to move longitudinally of the conveyer relative to each other when they are passing around the driving sprocket wheels without becoming entirely separated so that the formed articles deposited upon the conveyer will be carried around the turns without being apt to be dropped. The vertical dimension of the several slots or openings 20 is somewhat greater than the thickness of the plates engaged therein so that the conveyer plates will have a limited vertical movement at their outer ends and will be thereby permitted to ride over any slight irregularities in the surface of the moving element of the leer. The conveyer plates are preferably sheet metal so that, while they will be strong enough to firmly support the articles placed thereon, they will be durable and will have more or less resiliency so that, if the moving element of the leer, such as the apron 2, should be warped, the conveyer plates may readily yield to the irregular surface of the leer and ride over the same without clogging the operation of the machine. In order that the metal conveyer plates may not rapidly draw heat from the formed articles, small teats, indicated at 25, may be struck up or formed in the upper conveyer plates to minimize the area of contact between the plates and the articles while at the same time providing a firm support for the articles.

In the illustrated form of the invention, three driving sprocket wheels 19 are employed and they are arranged in triangular relation. These sprocket wheels each engages the conveyor chain so that they aid in supporting the conveyor and also actuate the same in an even steady manner. The sprocket wheels are mounted upon spindles 26 which are secured in a supporting structure of any approved design, and upon the upper side of each driving sprocket wheel is formed or secured a supplemental sprocket wheel 28 which is of much less diameter. Motion is imparted to the sprocket wheels and from them to the conveyer and the other working parts through suitable gearing by any convenient motor, and it is to be understood that the gearing and motor may be disposed so as to directly drive any one of the driving sprockets as may be best adapted to any given circumstances.

Idler sprockets 39 are disposed adjacent the auxiliary sprockets 28, a chain 40 being trained about the said sprockets 39, as shown in Fig. 1, and meshing with the sprockets 28 so that motion is imparted to the chain by the latter.

A carrier 42 is mounted to travel between the idlers 39 and is equipped with a clutch mechanism automatically engaging alternately with a notch 16 in the main conveyor and with a similar notch in the links of the chain 40 to be carried back and forth across the entrance to the leer. An unloader blade 49 is yieldably mounted on the carrier 42 and normally extends therefrom over the conveyor plates, as shown in Fig. 1. Should the article being unloaded strike an abnormally high part in the leer apron and tend to clog, the blade 49 will yield or swing rearwardly to pass by the obstructed article so that breaking of parts will be prevented. As soon as the obstructed article has been cleared, the unloader will return to its normal position and will operate as before. It will be understood, of course, that the article which tended to resist the unloading action of the blade 49 will have obtained a supporting engagement with the leer apron before the choking action occurred so that, notwithstanding the yielding of the blade, the article will be drawn from the conveyor and will be carried through the leer in the usual manner.

The articles which are to be delivered into the leer are indicated at 82 in Fig. 1. They may be tumblers, vases, or any other articles of glass or other similar material which ordinarily is shaped in a molding machine or the like and are then transferred to a furnace to be annealed, baked or otherwise hardened. The main conveyer travels at a much greater speed than the carrier when the articles are being unloaded and the operation is so timed that, while the articles may be spaced a considerable distance apart upon the main conveyer they will be delivered close together upon the leer apron and will be arranged in rows transversely of the leer apron and almost at a right angle to the side edges of said apron. For unloading the articles from the main conveyer, the carrier is engaged with the chain 40 so that it travels in opposition to the main conveyer and will, therefore, meet the articles upon the conveyer and push them successively from the conveyer onto the leer apron. When the carrier reaches the set limit of its travel in the unloading direction, the clutch mechanism is automatically released from the chain 40 and engaged with the main conveyer chain so that the carrier will then be caused to travel in the opposite direction to the starting point of its operation and then again be automatically disengaged from the main conveyer chain and engaged with the chain 40 so that the unloading operation will be repeated. It will thus be seen that the operation of the machine is entirely automatic after it has once been started and it may be continued without interruption as long as there are any articles to be conveyed from the molding apparatus to the leer.

Having thus described the invention, we claim:

1. In an apparatus for the purpose set forth, an endless conveyer comprising a chain set on edge, and overlapping plates secured to and extending laterally from the chain.

2. In an apparatus for the purpose set forth, an endless conveyer comprising a chain set on edge, and plates carried by the chain and extending laterally therefrom with the forward edge of one plate projecting under the opposed edge of the preceding plate.

3. In an apparatus for the purpose set forth, an endless conveyer consisting of a chain set on edge, and plates secured to the chain and projecting laterally therefrom, the plates being carried in pairs with the forward edges of each pair of plates received between the rear edges of a preceding pair of plates.

4. In an apparatus for the purpose set forth, an endless conveyer comprising a chain set on edge, and trapezoidal plates secured to and extending laterally from the chains, the longer of the parallel edges of the plates being remote from the chains whereby the side edges of the plates will have overlapping relation.

5. In an apparatus for the purpose set forth, an endless conveyer comprising a series of chain plates pivotally connected at their opposed side edges and each provided adjacent its lower edge with a longitudinal slot, and carrier plates disposed in lateral relation to the chain plates and each provided with a tang fitting within the slot of a chain plate and removably secured therein, the tang being of less thickness than the height of the slot.

6. In an apparatus for the purpose set forth, an endless conveyer comprising a chain set on edge, and plates secured to said chain and extending laterally therefrom, the said plates being provided with spaced projections on their upper sides.

7. In an apparatus for the purpose set forth, a conveyer comprising a series of horizontally disposed plates of trapezoidal form having their opposed edges in overlapping relation whereby to provide a continuous support for objects thereon while making turns.

8. In an apparatus for the purpose set forth, a conveyer comprising a series of chain plates pivotally connected at their opposed side edges, and carrier plates mounted upon the chain plates and extending laterally therefrom and having limited vertical play thereon.

In testimony whereof we affix our signatures.

FRED H. JOHNSON. [L. S.]
SHERMAN R. LATHROP. [L. S.]